United States Patent
Mattes et al.

(10) Patent No.: US 6,633,088 B1
(45) Date of Patent: Oct. 14, 2003

(54) CONTROL CIRCUIT FOR AN ALTERNATING-CURRENT IGNITION CIRCUIT OF A RESTRAINING MEANS

(75) Inventors: Bernhard Mattes, Sachsenheim (DE); Hartmut Schumacher, Freiberg (DE); Klaus Ringger, Neurtingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,061

(22) PCT Filed: May 10, 2000

(86) PCT No.: PCT/DE00/01462

§ 371 (c)(1),
(2), (4) Date: Mar. 20, 2001

(87) PCT Pub. No.: WO00/69689

PCT Pub. Date: Nov. 23, 2000

(30) Foreign Application Priority Data

May 18, 1999 (DE) .......................... 199 22 710

(51) Int. Cl.⁷ .................................. B60L 1/00

(52) U.S. Cl. .................. 307/10.1; 180/268; 701/45

(58) Field of Search ................. 307/10.1, 141.4, 307/141.8; 180/268; 701/45

(56) References Cited

U.S. PATENT DOCUMENTS

| | | | | |
|---|---|---|---|---|
| 4,956,631 A | * | 9/1990 | Itoh | 340/436 |
| 4,987,316 A | * | 1/1991 | White et al. | 307/10.1 |
| 5,081,442 A | * | 1/1992 | Ito et al. | 340/438 |
| 5,343,394 A | * | 8/1994 | Takeuchi et al. | 701/45 |
| 5,646,454 A | * | 7/1997 | Mattes et al. | 307/10.1 |
| 5,656,991 A | * | 8/1997 | Hargenrader et al. | 340/438 |
| 5,796,177 A | * | 8/1998 | Werbelow et al. | 307/10.1 |
| 6,185,488 B1 | * | 2/2001 | Nomoto | 701/29 |

FOREIGN PATENT DOCUMENTS

| | | |
|---|---|---|
| DE | 44 47 174 | 3/1996 |
| DE | 198 22 263 | 11/1998 |
| DE | 198 02 042 | 7/1999 |

* cited by examiner

Primary Examiner—Brian Sircus
Assistant Examiner—Sharon A. Polk
(74) Attorney, Agent, or Firm—Kenyon & Kenyon

(57) ABSTRACT

A drive circuit for an AC ignition circuit, which has at least one capacitor and at least one trigger element, which is used to deploy a restraint system in a motor vehicle, has a bridge circuit with four electronically controllable switches, of which two switches are connected in series between a supply voltage and ground, and the ignition circuit forms a bridge shunt between both pairs of switches connected in parallel. If a fault occurs in the bridge circuit, the individual switches are triggered so that charging and discharging of the capacitor in the ignition circuit is guaranteed in spite of the fault.

9 Claims, 1 Drawing Sheet

CONTROL CIRCUIT FOR AN ALTERNATING-CURRENT IGNITION CIRCUIT OF A RESTRAINING MEANS

FIELD OF THE INVENTION

The present invention relates to a drive circuit for an AC-ignition circuit, which includes at least one capacitor and at least one trigger element, which is used for deploying a restraint system in a motor vehicle, in which a bridge circuit having four electronically controllable switches is being provided, of which two switches are connected in series between a supply voltage and the ground and the ignition circuit forms a bridge shunt between the two switches connected in parallel; in the case of a fault occurring in the bridge circuit only those switches are activated which guarantee charge and discharge of the capacitor, in spite of the fault.

BACKGROUND INFORMATION

A drive circuit is described in German Published Patent Application No. 44 47 174. In systems relating to safety such as restraints (e.g., airbags, seat belt tighteners) in vehicles, the activation of ignition circuits should always be guaranteed, even when the drive circuit is faulty. For this purpose the drive circuit described in the document cited provides circuit variants of transistors in the bridge circuit for various types of fault (e.g., short circuits in the shunt of the bridge circuit to ground or to the supply voltage), which guarantee charging and discharging of the capacitor in spite of the fault. It does not emerge from German Published Patent Application No. 44 47 174 that the drive circuit responds to a defect of one of the electrically controllable switches existing in the bridge circuit in order to charge or discharge the capacitor in the event of such a fault.

SUMMARY OF THE INVENTION

Thus, an object of the present invention is to provide a drive circuit, which guarantees activation of the ignition circuit in the greatest possible number of fault occurrences, in particular when one of the electronic switches in the bridge circuit is defective.

The object is achieved in that, in the event of a defect in one of the two switches connected to ground, the capacitor is charged by closing the switch connected to the supply voltage, and connected in series with this defective switch, and by closing the switch connected to ground while belonging to the other pair of switches, and the capacitor is discharged by closing both switches connected to the supply voltage.

The capacitor can also be charged, when there is a defect in one of the switches connected to the supply voltage, by closing the switch connected to ground and connected in series with the defective switch and closing the switch connected to the supply voltage belonging to the other pair of switches, and the capacitor can be discharged by closing both switches connected to ground.

In addition, in the event of a short circuit of one of the two terminals of the ignition circuit to ground, the capacitor can be charged by closing that switch, connected to the supply voltage, which is connected to the terminal of the ignition circuit that is not short circuited. The capacitor is discharged by closing both switches connected to ground.

Moreover, when there is a short circuit of one of the two terminals of the ignition circuit to the supply voltage, the capacitor can be charged by closing that switch connected to ground which is connected to the terminal of the ignition circuit that is not short circuited. The capacitor is discharged by closing both switches connected to ground.

The circuit according to the present invention thus facilitates control of the ignition circuit even in the event of a very large number of possible occurrences of fault so that the restraint can be deployed without impediment in a motor vehicle crash.

BRIEF DESCRIPTION OF THE DRAWING

The FIGURE illustrates a drive circuit according to the present invention.

DETAILED DESCRIPTION

Figure 1:
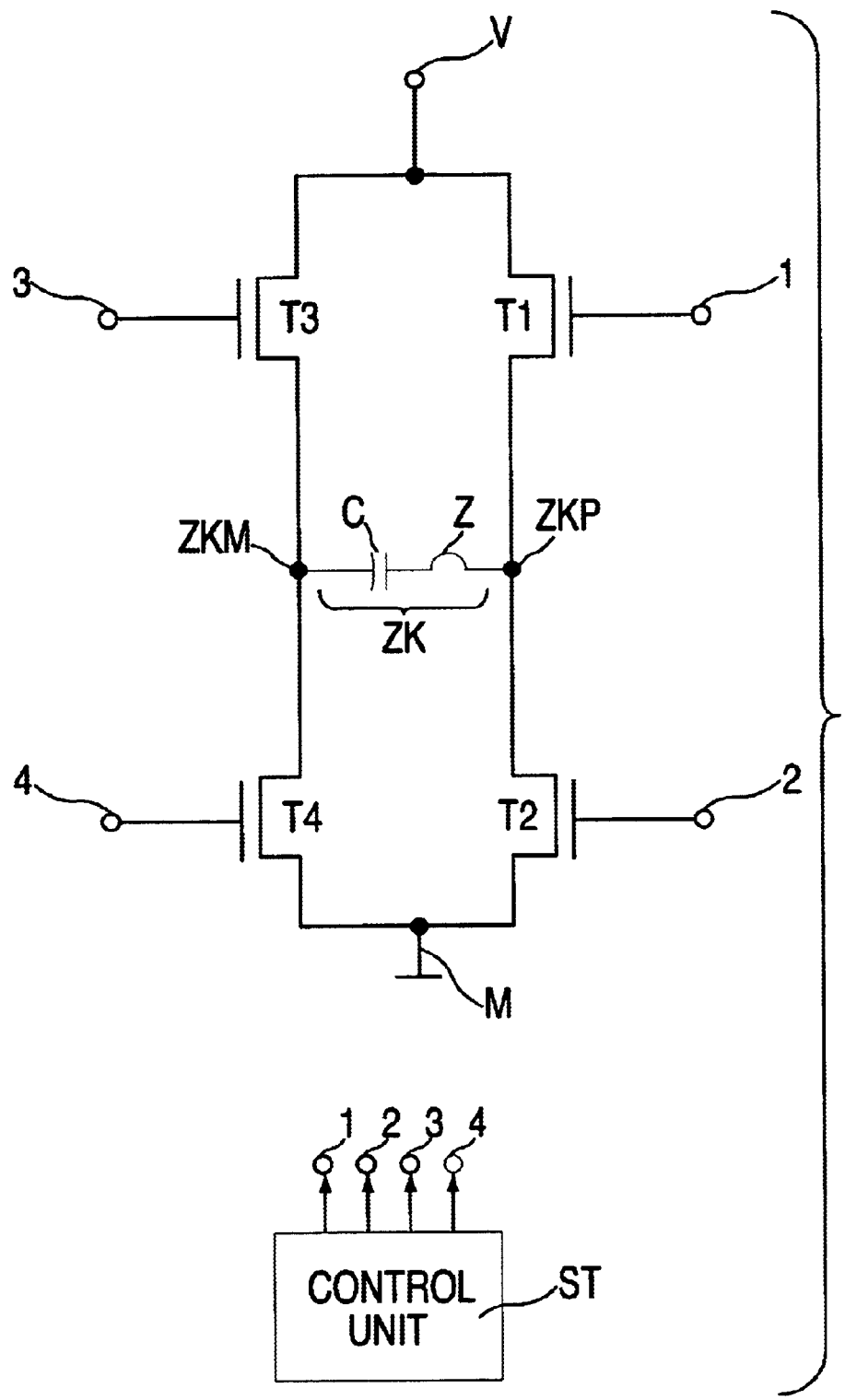

The drive circuit depicted in the figure for ignition circuit ZK includes a bridge circuit having four electronically controllable switches, preferably field-effect transistors T1, T2, T3, and T4. Thus transistor T1 is connected in series with transistor T2 and transistor T3 with transistor T4. The pair of transistors, T1 and T2, connected in series, is connected in parallel with the pair of transistors, T3 and T4, connected in series, supply voltage V being applied to the coupling point of both transistors, T1 and T3, and the coupling point of both transistors, T2 and T4, being connected to ground M. The ignition circuit, having at least one trigger element Z and one capacitor C, forms the shunt of the bridge switch. Connection point ZKM of ignition circuit ZK lies between both transistors, T3 and T4, and a second connection point ZKP of ignition circuit ZK lies between both transistors, T1 and T2.

Terminals 1, 2, 3, and 4, of the control electrodes of individual transistors, T1, T2, T3, and T4, are connected to control unit ST. Control unit ST controls the individual transistors, T1, T2, T3, and T4 of the bridge switch so that with a deployment command which the control unit receives from crash sensors, capacitor C of the ignition circuit is cyclically charged and discharged a number of times. This occurrence of charging and discharging a number of times is required because capacitor C of ignition circuit ZK as a rule has a very small capacitance so that the charge present in it with maximum voltage applied is insufficient for triggering trigger element Z. For setting off trigger element Z, rather more energy is required which is transported to the trigger element by charging and discharging a number of times the capacitor connected in series to trigger element Z. Thus a one-time flow of current with the capacitance present in the capacitor is insufficient to set off the trigger element.

Ignition circuit ZK should be triggered, and thus capacitor C should be charged, even when a fault occurs in the bridge circuit. In the following, eight different faults will be considered and the triggering sequences of transistors T1, T2, T3, and T4 resulting from them will be described. Control unit ST performs a diagnosis of individual transistors T1, T2, T3, and T4 and also monitors ignition circuit ZK whether its terminals ZKM and ZKP are short circuited with ground M or with supply voltage V. The fault diagnosis, which is based in a conventional manner on resistance measurements, will not be described in detail as it is not an object of the present invention.

$1^{st}$ Case of Fault:

Terminal ZKM of ignition circuit ZK is short circuited to ground. In this case transistor T1 is switched to be conductive in order to charge capacitor C, so that a current can flow from supply voltage source V over transistor T1 and ignition circuit ZK to ground M at terminal ZKM. The capacitor is discharged when transistor T2 is switched to be conductive, whereby, besides terminal ZKM being erroneously connected to ground M, terminal ZKP of ignition circuit ZK is also connected to ground M through transistor T2.

$2^{nd}$ Case of Fault:

Connection point ZKP of ignition circuit ZK is short circuited to ground. Then transistor T3 is switched to be conductive in order to charge capacitor C so that a current can flow to ground M from supply voltage source V through transistor T3 and ignition circuit ZK. In order to discharge capacitor C, transistor T4 is switched to be conductive so that the charging current can flow away from capacitor C to ground M.

$3^{rd}$ Case of Fault:

Terminal ZKM of ignition circuit ZK is short circuited to supply voltage V. In this case transistor T2 is switched to be conductive in order to charge capacitor C so that a current can flow to ground M from terminal ZKM connected to supply voltage V through ignition circuit ZK and transistor T2. Both transistors, T1 and T3, are switched to be conductive in order to discharge capacitor C.

$4^{th}$ Case of Fault:

Terminal ZKP of ignition circuit ZK is short circuited to supply voltage V. Transistor T4 is switched to be conductive in order to charge capacitor C so that a current flows to ground M from connecting point ZKP connected to the supply voltage through ignition circuit ZK and transistor T4. In order to discharge, again both transistors, T1 and T3, connected to supply voltage V are switched through.

$5^{th}$ Case of Fault:

Transistor T3 is defective, that is, it cannot be switched to be conductive. In order to charge capacitor C, both transistors, T1 and T4, are switched to be conductive so that a current can flow to ground M from supply voltage source V through transistor T1, ignition circuit ZK, and transistor T4. In order to discharge capacitor C both transistors, T2 and T4, connected to ground are switched to be conductive.

$6^{th}$ Case of Fault:

Transistor T1 is defective; that is, it cannot be switched to be conductive. In this case, both transistors, T3 and T2 are switched to be conductive in order to charge capacitor C so that a current can flow to ground M from supply voltage source V through transistor T3, ignition circuit ZK, and transistor T2. In order to discharge capacitor C, both transistors, T2 and T4, connected to ground M, are switched to be conductive.

$7^{th}$ Case of Fault:

Transistor T2 is defective, so it can no longer be switched to be conductive. In order to charge capacitor C, transistors T1 and T4 are switched to be conductive so that a current can flow to ground M from supply voltage source V through transistor T1, ignition circuit ZK, and transistor T4. Capacitor C is discharged by both transistors T1 and T3, connected to each other at the terminal for supply voltage source V, being switched to be conductive.

$8^{th}$ Case of Fault:

Transistor T4 is defective. In order to charge capacitor C, both transistors T3 and T2 are switched to be conductive so that a current can flow to ground M from supply voltage source V through transistor T3, ignition circuit ZK, and transistor T2. In order to discharge capacitor C, again both transistors T1 and T3 connected with each other are switched to be conductive.

What is claimed is:

1. A drive circuit for an AC ignition circuit including at least one capacitor and at least one trigger element for deploying a restraint system in a motor vehicle, comprising:
   a bridge circuit including four electronically controllable switches, a first two switches of the four electronically controllable switches being connected in series between a supply voltage and ground, a second two switches of the four electronically controllable switches being connected in series between the supply voltage and ground, and the AC ignition circuit forming a bridge shunt between the first two switches and the second two switches connected in parallel, wherein:
   the four electronically controllable switches are triggered to guarantee a charge and a discharge of the at least one capacitor in spite of a fault if the fault occurs in the bridge circuit,
   if a defect occurs in one of two switches connected to ground, the at least one capacitor is charged by:
      closing two other switches of the four electronically controllable switches, the two other switches being connected to the supply voltage and being connected in series with the one of the two switches connected to ground in which the defect occurs, and
      closing the two switches connected to ground, and the at least one capacitor is discharged by closing both of the two other switches connected to the supply voltage.

2. The drive circuit according to claim 1, wherein:
   if another defect occurs in one of the two other switches connected to the supply voltage, the at least one capacitor is charged by:
      closing one of the two switches connected to ground and connected in series with the one of the two other switches connected to the supply voltage and in which the other defect occurs, and
      closing one of the two other switches connected to the supply voltage, and
   the at least one capacitor is discharged by closing both of the two switches connected to ground.

3. The drive circuit according to claim 2, wherein:
   if the third switch is defective, the at least one capacitor is charged by switching the first switch and the fourth switch to be conductive so that a current flows to ground from the supply voltage through the first switch, the AC ignition circuit, and the fourth switch, and
   the at least one capacitor is discharged by switching the second switch and the fourth switch to be conductive to ground.

4. The drive circuit according to claim 2, wherein:
   if the first switch is defective, the at least one capacitor is charged by switching the third switch and the second switch to be conductive so that a current flows to ground from the supply voltage through the third switch, the AC ignition circuit, and the second switch, and
   the at least one capacitor is discharged by switching the second switch and the fourth switch to be conductive to ground.

5. The drive circuit according to claim 2, wherein:
   if the second switch is defective, the at least one capacitor is charged by switching the first switch and the fourth switch to be conductive so that a current flows to ground from the supply voltage through the first switch, the AC ignition circuit, and the fourth switch, and the at least one capacitor is discharged by switching the first switch and the third switch to be conductive to ground.

6. The drive circuit according to claim 2, wherein:

if the fourth switch is defective, the at least one capacitor is charged by switching the third switch and the second switch to be conductive so that a current flows to ground from the supply voltage through the third switch, the AC ignition circuit, and the second switch, and the at least one capacitor is discharged by switching the first switch and the third switch to be conductive to ground.

7. The drive circuit according to claim 1, wherein:

if a short circuit occurs in one of two terminals of the AC ignition circuit to ground, the at least one capacitor is charged by closing the one of the two other switches that is connected to the supply voltage and connected to one of the two terminals of the AC ignition circuit that is not short circuited, and the at least one capacitor is discharged by closing both of the two switches connected to ground.

8. The drive circuit according to claim 1, wherein:

if a short circuit occurs in one of two terminals of the AC ignition circuit to the supply voltage, the at least one capacitor is charged by closing the one of the two switches that is connected to ground and connected to one of the two terminals of the AC ignition circuit that is not short circuited, and the at least one capacitor is discharged by closing both of the two other switches connected to the supply voltage.

9. The drive circuit according to claim 1, wherein the four electronically controllable switches include:

a first switch connected to the supply voltage;

a second switch connected to ground;

a third switch connected to the supply voltage; and a fourth switch connected to ground.

* * * * *